Patented June 7, 1932

1,861,900

UNITED STATES PATENT OFFICE

WALTER S. BEANBLOSSOM, OF NIAGARA FALLS, NEW YORK, ASSIGNOR TO HOOKER ELECTROCHEMICAL COMPANY, OF NEW YORK, N. Y., A CORPORATION OF NEW YORK

PROCESS FOR THE PRODUCTION OF THIONYL CHLORIDE

No Drawing. Application filed April 10, 1930. Serial No. 443,247.

The present invention relates to processes for the production of thionyl chloride.

Several processes for the preparation of thionyl chloride already have been proposed, but they appear to be attended by certain disadvantages: in some cases, relatively costly chemicals are required; in others undesirable phosphorus compounds contaminate the product; and in carrying out certain of the known processes pressure vessels are required.

The present invention has for its object the provision of an economical, safe, simple process for the production of relatively pure thionyl chloride free from phosphorus compounds, and requires only relatively cheap starting materials.

The above, and other, objects of invention have been attained by treating sulfuric acid with sulfur dichloride,—or a substance which yields sulfur dichloride upon treatment with chlorine,—and with chlorine.

In carrying out the process of the present invention, sulfur dichloride is slowly added, with stirring, to sulfuric acid in a suitable vessel, at atmospheric pressure while introducing chlorine gas into the mixture, and the mixture is gently heated, with stirring, while being kept saturated with chlorine gas, until a homogeneous reaction mixture is produced. Thereafter the content of thionyl chloride is separated from the reaction mixture by an appropriate procedure, such as, for instance, distillation.

In order to minimize or avoid losses due to the escape of vapors, it is desirable to maintain the temperature at as low a point as is possible consistent with the production of thionyl chloride. To this end, it has been found that the reaction may be effected at satisfactorily low temperatures by carrying out the same in the presence of a relatively small but effective amount of a suitable catalyst such, for instance, as mercuric chloride, antimony trichloride or chlorides of various other heavy metals. The use of such a catalyst not only admits of effecting the reaction at lower temperatures but also has the desirable result of accelerating the speed of reaction.

The following equation may be assumed to represent the course of the reaction:

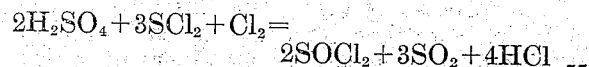

$$2H_2SO_4 + 3SCl_2 + Cl_2 = 2SOCl_2 + 3SO_2 + 4HCl$$

The invention will be described more particularly by reference to the following illustrative example of a typical embodiment thereof, it being understood, nevertheless, that the invention is not limited to the specific conditions and proportions therein stated:

40 parts of sulfuric acid (100%) and 0.4 parts of mercuric chloride are placed in a suitable vessel and, while maintaining the temperature below 30° C., 73.5 parts of sulfur dichloride is added, with constant stirring, while introducing chlorine gas into the mixture. The contents are then refluxed at a temperature of from 50° to 70° C. until a homogeneous mixture is produced, the reaction mixture being kept saturated with chlorine gas throughout the heating. The resulting mixture thereafter is distilled, yielding a distillate containing about 38 parts of thionyl chloride with a trace of sulfur dichloride, and a residue of acid containing the catalyst. The said residue,—as well as any sulfur dichloride which may be present in the distillate,—may be re-employed in a succeeding charge.

It is preferable, although not essential, that 100% sulfuric acid be employed, the water present in a weaker acid favoring decomposition of the product.

As will have become apparent from the foregoing, there may be substituted for the sulfur dichloride a substance capable of producing the sulfur dichloride upon treatment with chlorine, the total amount of chlorine used being correspondingly increased, and it is to be understood therefore, that the invention embraces such a substitution.

Thus, for example, in lieu of the direct addition of sulfur dichloride to the sulfuric acid there may be added sulfur or sulfur monochloride either of which yields sulfur dichloride when treated with chlorine in accordance with the following equations:

$$S + Cl_2 = SCl_2$$

or $$S_2Cl_2 + Cl_2 = 2SCl_2$$

I claim:

1. Process of producing thionyl chloride, which comprises treating sulfuric acid with sulfur dichloride and chlorine, and separating the so-formed thionyl chloride from the resulting reaction mixture by distillation.

2. Process of producing thionyl chloride, which comprises adding sulfur dichloride to sulfuric acid slowly and with constant agitation while introducing chlorine gas into the below 30° C. with constant agitation while maintaining it saturated with chlorine gas, and separating the so-formed thionyl chloride from the resulting reaction mixture by distillation.

3. process of producing thionyl chloride, which comprises slowly adding sulfur dichloride to sulfuric acid at a temperature below 30° C. with constant agitation while introducing chlorine gas into the mixture, heating the mixture under reflux at a temperature of from 50° to 70° C., while maintaining it saturated with chlorine gas, until a homogeneous reaction mixture is obtained, and separating the so-formed thionyl chloride from the reaction mixture by distillation.

4. Process of producing thionyl chloride, which comprises slowly adding sulfur dichloride to 100% sulfuric acid at a temperature below 30° C. with constant agitation while introducing chlorine gas into the mixture, heating the mixture under reflux at a temperature of from 50° to 70° C., while maintaining it saturated with chlorine gas, until a homogeneous reaction mixture is obtained, and separating the so-formed thionyl chloride from the reaction mixture by distillation.

5. Process as claimed in claim 1, in which the reaction is effected in the presence of a relatively small but effective amount of catalytically acting heavy metal chloride.

6. Process as claimed in claim 1, in which the reaction is effected in the presence of a relatively small but effective amount of a chloride of a metal of the group including mercury and antimony.

7. Process as claimed in claim 1, in which the reaction is effected in the presence of a relatively small but effective amount of mercuric chloride.

In testimony whereof, I affix my signature.

WALTER S. BEANBLOSSOM.